US009531762B2

(12) United States Patent
La Pierre et al.

(10) Patent No.: US 9,531,762 B2
(45) Date of Patent: Dec. 27, 2016

(54) IDENTIFYING PHONE CALLS FOR INTERNET TELEPHONY FEATURE HANDLING BY ROUTING THE PHONE CALLS TO A SOFTSWITCH VIA A DEDICATED TRUNK

(75) Inventors: Stephen La Pierre, Union City, GA (US); Shiejye Geoffrey Lin, Duluth, GA (US)

(73) Assignee: AT&T Intellectual Property I, L.P., by transfer of ownership from AT&T Delaware Intellectual Property, Inc., Atlanta, GA (US)

( * ) Notice: Subject to any disclaimer, the term of this patent is extended or adjusted under 35 U.S.C. 154(b) by 1912 days.

(21) Appl. No.: 11/926,672

(22) Filed: Oct. 29, 2007

(65) Prior Publication Data

US 2009/0109958 A1 Apr. 30, 2009

(51) Int. Cl.
| | |
|---|---|
| H04L 12/66 | (2006.01) |
| H04L 29/06 | (2006.01) |
| H04L 12/00 | (2006.01) |
| H04M 3/42 | (2006.01) |
| H04M 7/12 | (2006.01) |

(52) U.S. Cl.
CPC ......... H04L 65/104 (2013.01); H04L 65/1046 (2013.01); H04L 65/1069 (2013.01); H04M 7/127 (2013.01); H04M 7/128 (2013.01); H04M 7/1235 (2013.01)

(58) Field of Classification Search
CPC .... H04L 65/403; H04L 12/18; H04L 12/1818; H04L 12/1822; H04L 12/1813; H04L 12/66; H04L 29/06414; H04L 47/10; H04L 47/70; H04L 65/1069; H04M 2203/2044; H04M 7/006; H04M 3/4285; H04M 3/56; H04M 2201/16; H04M 2201/14; H04M 2250/62; H04Q 3/0025; H04Q 3/0045
USPC . 370/259–271, 352–356, 241–253; 709/204; 379/202.01, 205.01, 15.01–15.02, 379/242, 93.21, 156–158, 201.01; 375/224–228; 455/423–425, 67.11–67.7, 455/115.1–115.4, 518, 416
See application file for complete search history.

(56) References Cited

U.S. PATENT DOCUMENTS

| | | | | |
|---|---|---|---|---|
| 5,633,919 | A * | 5/1997 | Hogan et al. | 379/115.01 |
| 6,064,653 | A * | 5/2000 | Farris | 370/237 |
| 6,289,010 | B1 * | 9/2001 | Voit et al. | 370/352 |
| 6,333,931 | B1 * | 12/2001 | LaPier et al. | 370/385 |
| 6,404,746 | B1 * | 6/2002 | Cave et al. | 370/262 |
| 6,522,876 | B1 * | 2/2003 | Weiland et al. | 455/414.1 |
| 6,622,016 | B1 * | 9/2003 | Sladek et al. | 455/414.1 |
| 6,661,785 | B1 * | 12/2003 | Zhang | H04L 29/06027 370/352 |
| 6,678,265 | B1 * | 1/2004 | Kung et al. | 370/352 |
| 6,731,630 | B1 * | 5/2004 | Schuster et al. | 370/356 |

(Continued)

*Primary Examiner* — Wutchung Chu
(74) *Attorney, Agent, or Firm* — Myers Bigel P.A.

(57) ABSTRACT

A communication system includes a plurality of time division multiplexed (TDM) public switched telephone network (PSTN) trunks, a Signal Control Point (SCP), a Softswitch, and an Internet telephony call controller. The SCP a plurality of phone numbers for time division multiplexed TDM PSTN lines with an Internet telephony feature group that has Internet telephony feature handling. The SCP routes phone calls that are directed to phone numbers in the Internet telephony feature group through at least one dedicated trunk of the PSTN to the Softswitch. The Softswitch routes phone calls that it receives on the dedicated trunk to the Internet telephony call controller for Internet telephony feature handling.

14 Claims, 5 Drawing Sheets

(56) References Cited

U.S. PATENT DOCUMENTS

| | | | |
|---|---|---|---|
| 6,775,269 B1* | 8/2004 | Kaczmarczyk et al. | 370/352 |
| 6,865,266 B1* | 3/2005 | Pershan | H04M 3/42297 |
| | | | 379/201.01 |
| 6,954,455 B1* | 10/2005 | Al Hakim | H04L 29/12009 |
| | | | 370/252 |
| 6,961,416 B1* | 11/2005 | Summers et al. | 379/202.01 |
| 6,993,355 B1* | 1/2006 | Pershan | 455/518 |
| 6,996,094 B2* | 2/2006 | Cave et al. | 370/356 |
| 7,046,658 B1* | 5/2006 | Kundaje et al. | 370/352 |
| 7,458,084 B2* | 11/2008 | Zhang et al. | 719/328 |
| 7,474,432 B1* | 1/2009 | Kirchhoff et al. | 358/1.15 |
| 7,693,135 B2* | 4/2010 | Pershan | 370/352 |
| 7,813,335 B2* | 10/2010 | Terpstra et al. | 370/352 |
| 7,865,178 B2* | 1/2011 | Haaramo et al. | 455/414.1 |
| 7,881,453 B2* | 2/2011 | Khuc et al. | 379/265.01 |
| 8,077,849 B2* | 12/2011 | Altberg et al. | 379/201.01 |
| 8,442,197 B1* | 5/2013 | Mazza et al. | 379/202.01 |
| 8,565,406 B2* | 10/2013 | Levine | 379/221.09 |
| 8,798,258 B1* | 8/2014 | Croak et al. | 379/266.09 |
| 2002/0126827 A1* | 9/2002 | Pelletier et al. | 379/230 |
| 2002/0141357 A1* | 10/2002 | Park et al. | 370/328 |
| 2002/0167943 A1* | 11/2002 | Hakim et al. | 370/356 |
| 2003/0002448 A1* | 1/2003 | Laursen et al. | 370/261 |
| 2003/0043787 A1* | 3/2003 | Emerson, III | H04M 7/0003 |
| | | | 370/352 |
| 2003/0108176 A1* | 6/2003 | Kung | H04M 3/54 |
| | | | 379/211.02 |
| 2004/0090954 A1* | 5/2004 | Zhang et al. | 370/352 |
| 2004/0110465 A1* | 6/2004 | Bedingfield et al. | 455/3.05 |
| 2004/0170160 A1* | 9/2004 | Li et al. | 370/352 |
| 2004/0228336 A1* | 11/2004 | Kung | H04L 12/14 |
| | | | 370/352 |
| 2005/0068942 A1* | 3/2005 | Chu et al. | 370/352 |
| 2006/0045030 A1* | 3/2006 | Bieselin | 370/260 |
| 2006/0270447 A1* | 11/2006 | Everson et al. | 455/552.1 |
| 2007/0147343 A1* | 6/2007 | Sasaki | H04M 7/006 |
| | | | 370/352 |
| 2007/0172046 A1* | 7/2007 | Pfleging et al. | 379/202.01 |
| 2007/0183399 A1* | 8/2007 | Bennett | 370/352 |
| 2007/0286390 A1* | 12/2007 | Ma | 379/211.01 |
| 2008/0025489 A1* | 1/2008 | Dye et al. | 379/202.01 |
| 2008/0144798 A1* | 6/2008 | Sidhom et al. | 379/211.02 |
| 2012/0287924 A1* | 11/2012 | Sterman et al. | 370/352 |
| 2013/0242982 A1* | 9/2013 | Kundaje et al. | 370/352 |

* cited by examiner

IDENTIFYING PHONE CALLS FOR INTERNET TELEPHONY FEATURE HANDLING BY ROUTING THE PHONE CALLS TO A SOFTSWITCH VIA A DEDICATED TRUNK

BACKGROUND OF THE INVENTION

The present invention relates to communication networks and methods of operating the same, and, more particularly, to an overlay architecture for providing Internet telephony like features to time division multiplexed phones and methods of operating the same.

Internet telephony, also referred to herein as Voice-Over Internet Protocol (VoIP), Voice-Over Network (VoN), and/or Internet Protocol Telephony (IP Telephony), is becoming increasingly popular due, in part, to marked improvements in reliability and sound quality of the service. The improved performance of Internet telephony communications may be due to upgrades made to the Internet backbone through improved switching fabrics, such as Asynchronous Transfer Mode (ATM) fabrics, and to implementation of new communications standards, such as standards for transport protocols, directory services, and/or audio codec format.

Currently, to provide Internet telephony communications to a customer, a customer obtains equipment, such as Integrated Access Devices (IADs), Analog Terminal Adaptors (ATAs), telephone adapters (TAs), and the like, to be installed at the customer's premises, for example, a customer's home. The equipment is used to support a voice and control path within the premises and through a broadband network connection, for example, a digital subscriber line (DSL) connection, back to an Internet Service Provider (ISP). Once the necessary equipment is installed, customers/subscribers can connect their existing analog phones, for example, Plain Old Telephone Service (POTS) phones, to the ATA(s). The ATA(s) provide such functionality as dial tone, battery, and power ringing as part of providing POTS functionality through the VoN service. Normally, a Central Office (CO) switch provides dial tone, battery, and power ringing for analog phones.

Internet telephony technology can provide telephone users with features such as calling name and number, call management options, and the like. While some customers may desire such features, they may not have access to the required broadband network connection and/or may prefer to continue to use their analog phones with the reliable time division multiplexing (TDM) technology and powered by the CO, rather than acquire the customer premises equipment (CPE) to support Internet telephony service.

SUMMARY

Some embodiments of the present invention are directed to operation of communication system, which includes associating a plurality of phone numbers for time division multiplexed (TDM) public switched telephone network (PSTN) lines with an Internet telephony feature group that has Internet telephony feature handling. Phone calls that are directed to phone numbers in the Internet telephony feature group are routed through at least one dedicated trunk of the PSTN to a Softswitch. Phone calls received by the Softswitch on the dedicated trunk are routed to an Internet telephony call controller for Internet telephony feature handling.

Some other embodiments are directed to a Signal Control Point (SCP) within a PSTN. The SCP includes an Internet telephony feature controller that is configured to associate a plurality of phone numbers for TDM PSTN lines with an Internet telephony feature group that has Internet telephony feature handling. The Internet telephony feature controller is further configured to route phone calls that are directed to phone numbers in the Internet telephony feature group through at least one dedicated trunk of the PSTN to a Softswitch for routing to an Internet telephony call controller for Internet telephony feature handling.

Some other embodiments are directed to a Softswitch that includes an Internet telephony call router controller that is configured to receive phone calls on a plurality of trunks of a public switched telephone network (PSTN). The Internet telephony call router controller is further configured to decide whether to route individual ones of the phone calls through an Internet protocol (IP) network to an Internet telephony call controller for Internet telephony feature handling in response to whether the individual phone call was received by the Softswitch on a dedicated one of the trunks of the PSTN that is designated for carrying calls for Internet telephony feature handling.

Other systems, methods, and/or computer program products according to embodiments of the invention will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION OF EMBODIMENTS

Figure 1:
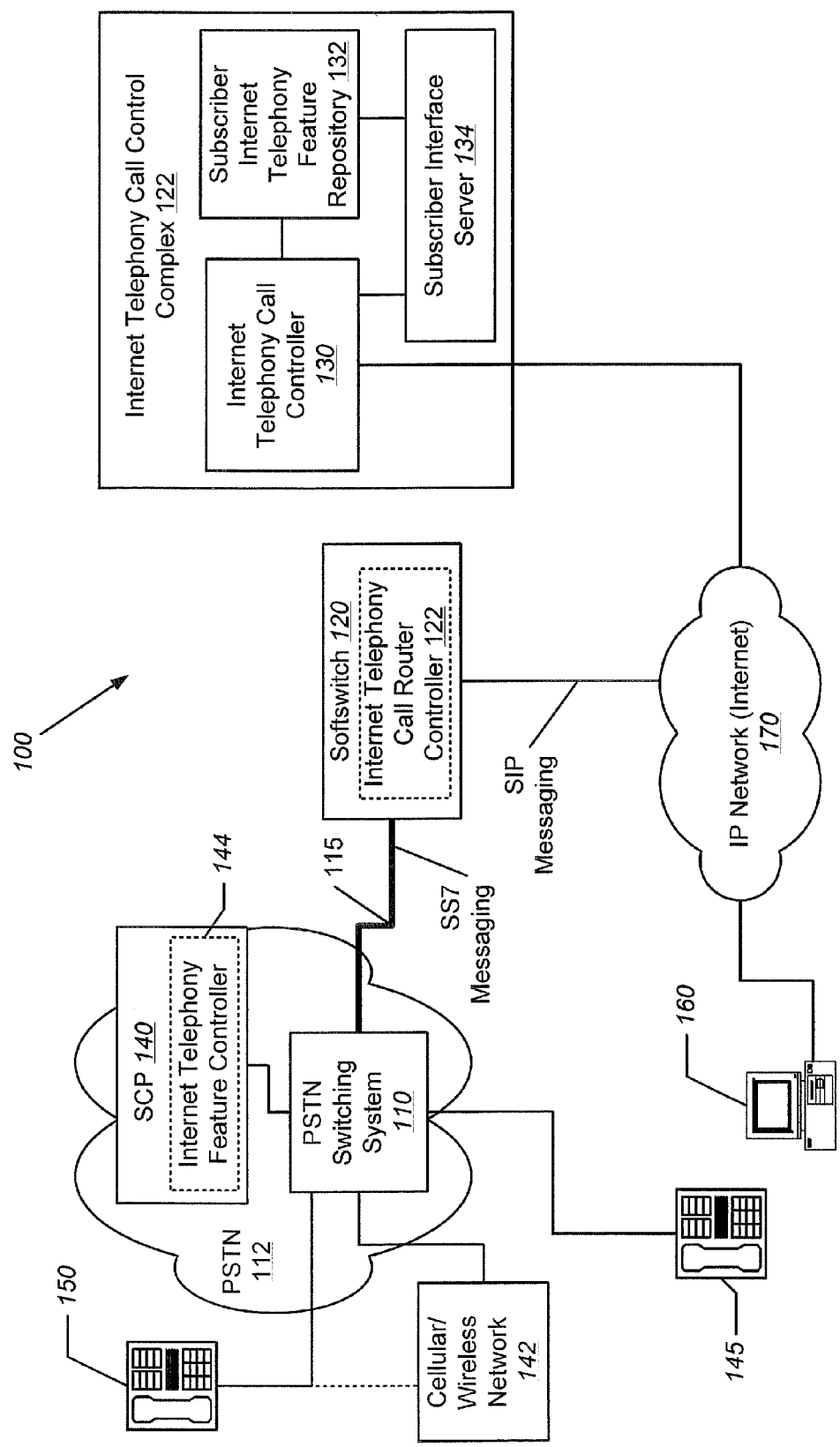
FIG. 1 is a block diagram that illustrates a communication system for providing Internet telephony like features to TDM phone lines in accordance with some embodiments of the present invention.

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention as defined by the claims. Like reference numbers signify like elements throughout the description of the figures.

As used herein, the singular forms "a," "an," and "the" are intended to include the plural forms as well, unless expressly stated otherwise. It should be further understood that the terms "comprises" and/or "comprising" when used in this specification is taken to specify the presence of stated features, integers, steps, operations, elements, and/or components, but does not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present invention may be embodied as methods, electronic devices, and/or computer program products. Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, as will be described below, various embodiments may take the form of a computer program product on a computer-usable or computer-readable storage medium having computer-usable or computer-readable program code embodied in the medium for use by or in connection with an instruction execution system.

Various embodiments of the present invention are directed to providing an Internet telephony (e.g., VoIP) overlay architecture for a PSTN so as to provide Internet telephony like features for customers who are using analog phones and/or other communication terminals to make and/or receive calls that are terminated through the PSTN using TDM technology. In accordance with some embodiments, Internet telephony like features can include, but are not limited to, displaying calling name and/or number of an entity associated with a calling phone line, call forwarding to one or more defined phone numbers, recording phone calls in a call log that is accessible by a subscriber, selectively allowing/blocking incoming phone calls based on a defined profile. For example, using Internet telephony features, a subscriber can define a call profile that will selectively allow/block phone calls within or outside defined time of day windows, defined days of the week windows, and/or which are included within or not-included within a defined phone number list(s).

One prior art approach to providing an Internet telephony overlay architecture for a PSTN used advanced intelligent network (AIN) call forwarding to map (port) customers' phone numbers, which were assigned to TDM trunks, to VoIP phone numbers, which were assigned to and handled by the Internet telephony overlay architecture.

According to this prior art approach, every TDM subscriber who was provided with Internet telephony feature handling was assigned a TDM phone number and a shadow IP phone number. When the TDM phone number was dialed, the phone call was intercepted, a mapping table was used to substitute the shadow IP phone number for the primary phone number, and the phone call was then routed through the PSTN to a Softswitch using the shadow IP phone number. The Softswitch identified from the shadow IP phone number that the phone call needed Internet telephony feature handling, and responded by converted the phone call into a VoIP call which it routed through an IP network to an Internet telephony call control complex.

Potential drawbacks of this prior art approach included the necessity for the communication system to maintain at least two phone numbers for every TDM subscriber which was provided with Internet telephony features. This approach could also result in increased complexity in the communication system in order to assign, maintain, and process the mapping between TDM phone numbers and shadow IP phone numbers and to provide compliance with regulatory provisions for number portability.

Referring now to FIG. 1, an exemplary communication system 100, in accordance with some embodiments of the present invention, includes a PSTN 112, a Softswitch 120, and Internet telephony call control complex 122. The PSTN 102 can include a PSTN switching system 110 with a plurality of TDM PSTN trunks, and a Signal Control Point (SCP) 140. The Internet telephony call control complex 122 can include an Internet telephony call controller 130, a subscriber Internet telephony feature repository 132, and a subscriber interface server 134.

In accordance with various embodiments of the present invention, the SCP 140 associates a plurality of phone numbers of the switching system 110, i.e., certain called phone numbers, that have Internet telephony feature handling to a defined Internet telephony feature group. The SCP 140 routes phone calls that are directed to phone numbers in the Internet telephony feature group through at least one dedicated TDM trunk (e.g., dedicated trunk group) 115, of the switching system 110, to the Softswitch 120. An Internet telephony call router controller 122 in the Softswitch 120 routes phone calls that are received on the dedicated trunk 115 to the Internet telephony call controller 130 for Internet telephony feature handling.

Because the dedicated trunk 115 of the switching system 110 may be used to only route phone calls to the Softswitch 120 for subsequent routing to the Internet telephony call controller 130, the phone calls can be routed to the Softswitch 120 without needing to use shadow IP phone numbers. The Softswitch 120 therefore knows that any phone call that is received on the dedicated trunk 115 is to be routed to the Internet telephony call controller 130. Moreover, the Softswitch 120 (e.g., via the Internet telephony call router controller 122) can automatically convert all TDM phone calls it receives through the dedicated trunk 115 into VoIP phone calls that it routes to the Internet telephony call controller 130, and without needing to carry-out other operations to determine whether or not to perform the conversion of such calls. Use of the dedicated trunk 115 can thereby avoid the Softswitch 120 needing to maintain and refer to a table that would identify which particular phone numbers are shadow IP phone numbers that are to suppose be routed to the Internet telephony call controller 130.

The switching system 110 may include a Class 5 Switch, such as the 5ESS™ switch sold by Lucent Technologies, Inc. The switching system 110 may terminate thousands of analog phone lines, such as illustrated by the exemplary analog phone 145. The switching system 110 forms a portion of the PSTN 112, which includes many signaling networks, such as Common Channel Signaling (CCS) networks, and which can interface to other wireline/wireless switching systems (e.g. cellular/wireless network 142) and. One such CCS network is the Signaling System 7 (SS7) network.

In an SS7 network, signaling messages are used to setup, manage, and release network resources to complete (terminate) calls/connections. The signaling traffic is carried by one or more Signal Transfer Points (STPs). An STP is typically embodied as a packet switch that routes each incoming message to an outgoing signaling link based on routing information contained in the SS7 message.

The SCP 140 can be configured to trigger Internet telephony feature handling (e.g., Intelligent Network (IN) services) for phone calls in the switching system 110 by communicating with the switching system 110 and the Softswitch 120 using special signaling messages.

As discussed above, the PSTN includes many wireline and wireless switching systems (e.g., systems 110 and 142) that may terminate phone lines of varying types as represented by the analog phone 145 and the other phone 150. Phone 150 may be, for example, an analog phone, digital phone, or mobile terminal. As used herein, the term "mobile terminal" may include a satellite and/or cellular radiotelephone, laptop computer, and/or palmtop computer that includes a radiotelephone transceiver.

At least one dedicated trunk 115 communicatively couples the switching system 110 and the Softswitch 120. The Internet telephony call router controller 122 of the Softswitch 120 provides a communication gateway interface between the circuit-switched PSTN network 112 and the packet switched IP network 170.

The Softswitch 120 in combination with the Internet telephony call control complex 122 can form part of an Internet telephony overlay network that can provide Internet telephony like features, which conventionally are provided to customers that have purchased Internet telephony (e.g., VoN) service and have installed the accompanying customer premises equipment (CPE), to customers that have an analog phone, such as the analog phone 145. As understood by those of skill in the art in view of the present description, the Internet telephony call control complex 122 may include other servers and systems in addition to the controller 130, the repository 132, and the server 134, such as, but not limited to, Network servers, Feature Servers, Web servers, Media servers, etc.

The Softswitch 120 may communicate with the Internet telephony call controller 130 using Session Initiation Protocol (SIP) messaging to establish communication sessions through the IP network 170. SIP may be used to transport the converted VoIP phone call between the Softswitch 120 and the Internet telephony call controller 130 in IP data packets. In some embodiments of the present invention, the Internet telephony call controller 130 may run BroadWorks™ VoIP application software provided by the BroadSoft™ corporation of Gaithersburg Md. in combination with the Internet telephony feature controller 144 and the Internet telephony call router controller 122 to provide Internet telephony like features to a customer that uses the analog phone 145 and/or the other telephone 150.

The functionality of various elements of the communication system 100 of FIG. 1 is described below with regard to the operational and communication timing diagram of FIG. 2 and the flowcharts of FIG. 3-6. These figures further illustrate exemplary operation of the communication system 100 to provide Internet telephony like features to customers who are communicating through TDM lines of the PSTN 112 in accordance with various embodiments of the present invention.

Figure 2:
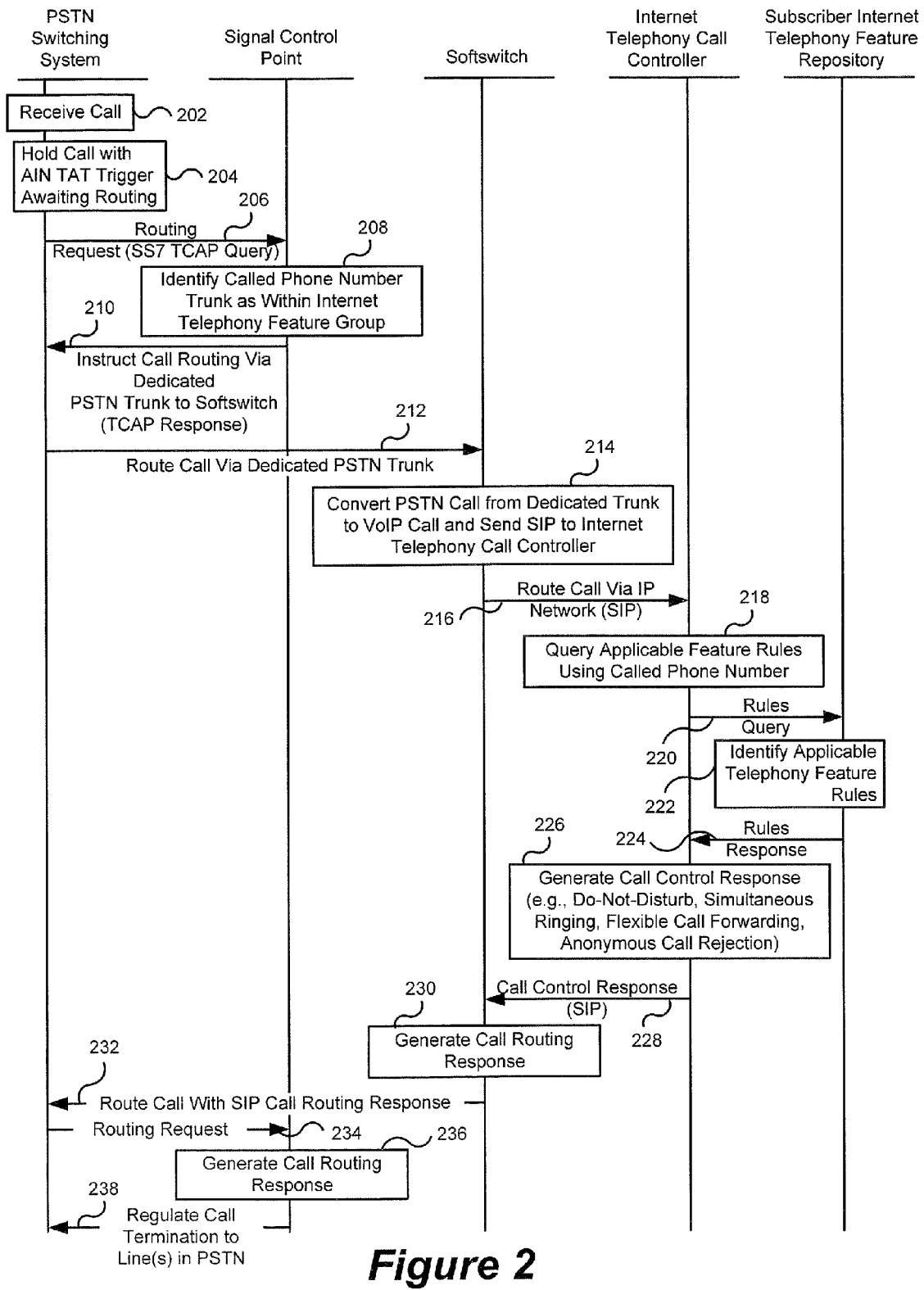
FIG. 2 is an operational and communication timing diagram of the communication system of FIG. 1 in accordance with some embodiments of the present invention.
Figure 3:
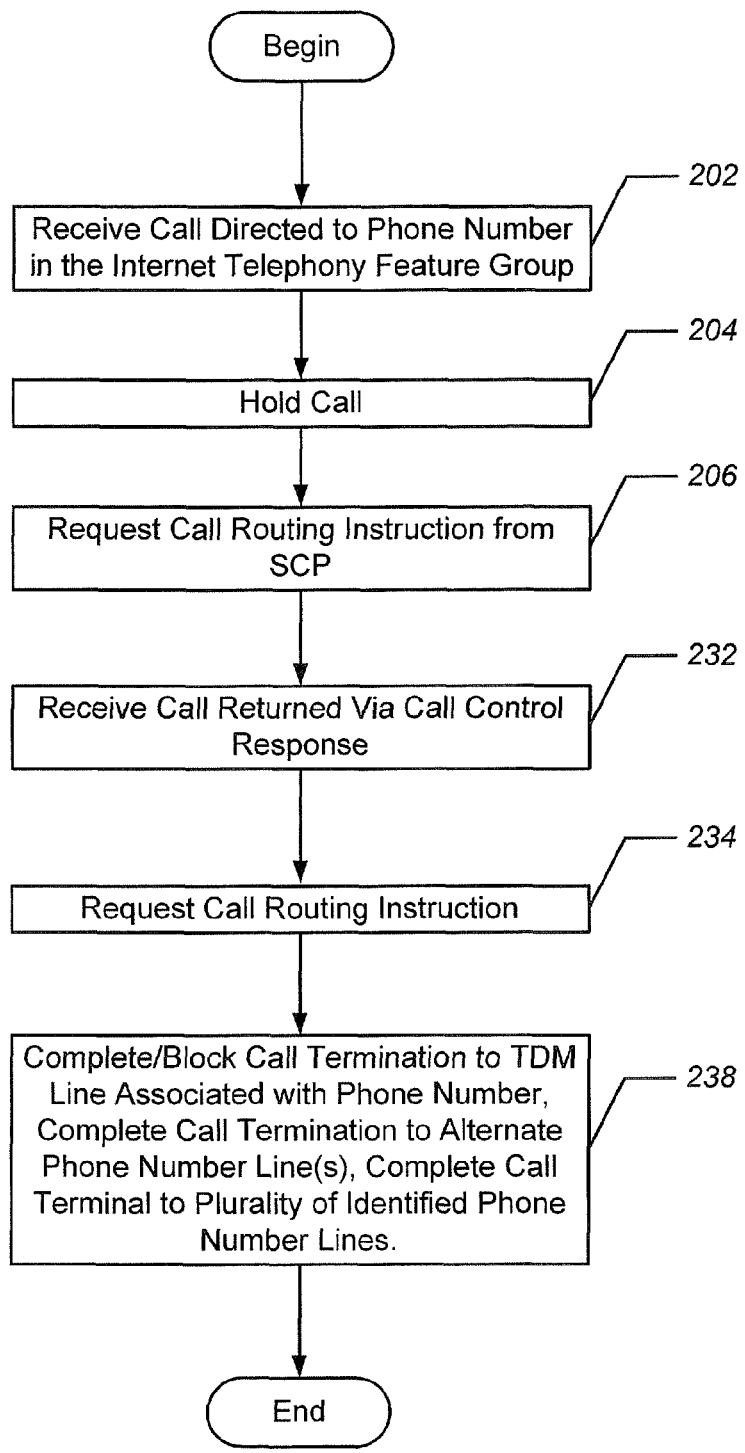
FIG. 3 is a flowchart that illustrates operations of the switching system of FIG. 1 in accordance with some embodiments of the present invention.

FIG. 2 is an exemplary operational and communication timing diagram of the communication system 100 of FIG. 1. FIG. 3 is a flowchart that illustrates exemplary operations of the switching system 110. Referring to FIGS. 2 and 3, a Termination Attempt Trigger (TAT) function in the switching system 110 detects receipt (block 202) of a phone call attempt to an analog TDM line of the switching system 110 (e.g. to the analog telephone 145). Rather than terminate the call to the called line, the phone call is placed on hold (204) and the switching system 110 routes a request (206), such as a SS7 Transaction Capabilities Application Part (TCAP) query, to the SCP 140 for routing (termination) instructions.

Figure 4:
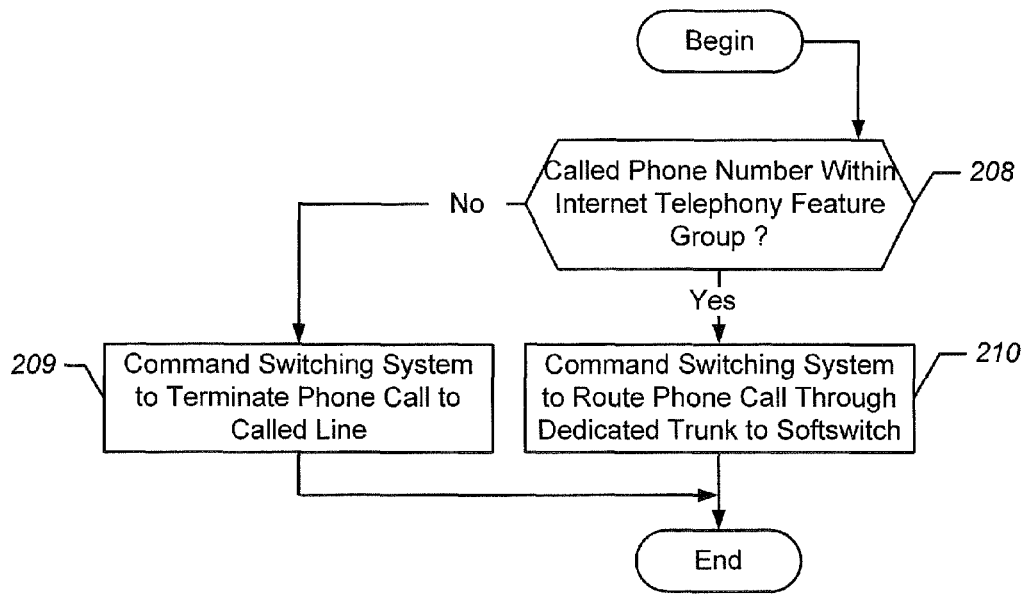
FIG. 4 is a flowchart that illustrates operations of the Signal Control Point of FIG. 1 in accordance with some embodiments of the present invention.

FIG. 4 is a flowchart that illustrates exemplary operations of the Internet telephony feature controller 144 within the SCP 140 ("SCP feature controller"). Referring to FIGS. 2 and 4, the SCP feature controller 144 identifies (block 208) the called phone number as being associated with a defined Internet telephony feature group and, thereby, that the called phone number has Internet telephony overlay feature handling associated therewith that is to be provided by the Internet telephony call controller 130. Responsive to that identification, the SCP feature controller 144 commands (communication 210) the switching system 110 to route the phone call through the dedicated trunk 115, or, when there are a plurality of dedicated trunks then commands routing through one of those dedicated trunks, to the Softswitch 120 (communication 212). In contrast, when the called phone number is not associated with the Internet telephony feature group, the SCP feature controller 144 commands (block 209) the switching system 110 to terminate the phone call to the called analog TDM line.

Figure 5:
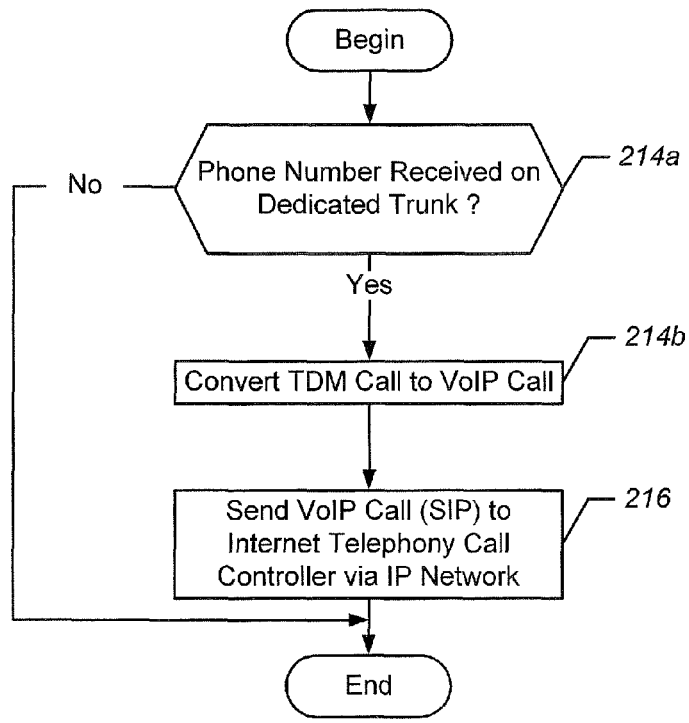
FIG. 5 is a flowchart that illustrates operations of the Softswitch of FIG. 1 in accordance with some embodiments of the present invention.

FIG. 5 is a flowchart that illustrates exemplary operations of the Internet telephony call router controller 122 within the Softswitch 120 ("Softswitch router controller"). Referring to FIGS. 2 and 5, because the dedicated trunk 115 of the switching system 110 is used to only route phone calls to the Softswitch 120 that are intended for routing therethrough to the Internet telephony call controller 130, the Softswitch router controller 122 therefore knows that any phone call that is received on the dedicated trunk 115 is to be routed to the Internet telephony call controller 130.

Accordingly, in response to receiving a phone call on the dedicated trunk (block 214a), the Softswitch router controller 122 automatically converts (block 214b) the phone call to a VoIP (or other Internet telephony) phone call and routes (block 216) the converted Internet telephony phone call to the Internet telephony call controller 130. The Softswitch router controller 122 may route (block 216) the converted VoIP phone call through the IP network 170 using SIP messaging.

Figure 6:
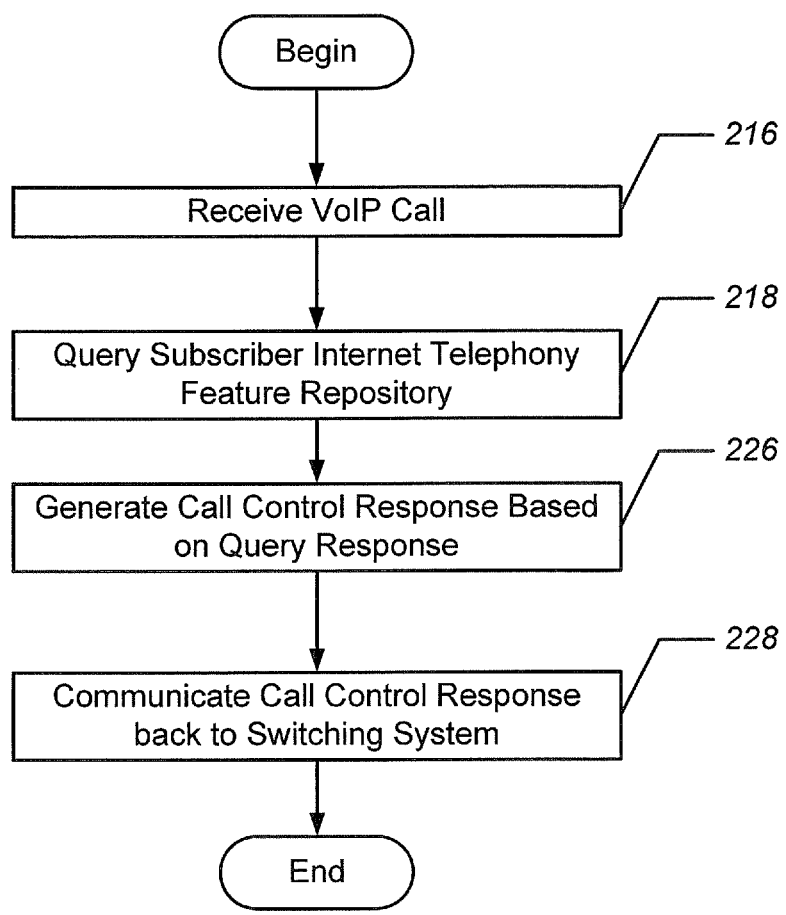
FIG. 6 is a flowchart that illustrates operations of the Internet telephony call controller of FIG. 1 in accordance with some embodiments of the present invention.

FIG. 6 is a flowchart that illustrates exemplary operations of the Internet telephony call controller 130. Referring to FIGS. 2 and 6, in response to receiving (block 216) the VoIP phone call from the Softswitch 120, the Internet telephony call controller 130 generates (block 218) a query (communication 220) to the subscriber telephony feature repository 132 to determine what feature rules it should apply to the phone call. The feature repository 132 identifies (block 222 of FIG. 2) applicable telephony feature rules in response to the called phone number and/or in response to the calling phone number, and provides a rules response (communication 224 of FIG. 2) back to the call controller 130.

The call controller 130 handles the phone call (block 226) according to the Internet telephony features identified by the rules response from the feature repository 132, and can generate a call control response that can be used by the SCP 140 to regulate termination of the phone call by the switching system 110. For example, the call controller 130 may cause the calling name and/or number of the entity associated with a calling phone line trunk to be displayed (via the call control response 228) on the called subscriber's phone (e.g., 145/150) and/or on another subscriber communication device, such as displayed in a pop-up window on the computer 160. The call controller 130 may alternatively or additionally cause an instance of the phone call to be recorded in a call log, which may be stored in the call controller 130 and/or elsewhere in the control complex 122, and where it is accessible to a subscriber, such as by using the computer 162 to log into the subscriber interface server 134 through the IP network 170.

Alternatively or additionally, the call controller 130 can generate the call control response 228 so as to indicate that the phone call is to be allowed or blocked, and/or to indicate that the phone call is to be forwarding to one or more defined phone numbers (e.g., forwarded to a plurality of group-call phone numbers which may or may not include the called phone number) and/or to a voice mail service.

The feature repository 132 may contain rules that define a time of day window(s) (range between defined times) and/or days of the week window(s) when phone calls are either allowed or not allowed, and may further define a list of phone numbers that are allowed or not allowed either within or outside the defined windows. For example, phone calls from defined phone numbers may be allowed at any time on any day, while other defined phone numbers may not be allowed at any time/day, while still other defined phone numbers and/or phone numbers that are outside the defined list may be allowed only when they occur within the defined time of day window(s) and/or on the defined days of the week window(s).

A subscriber may define rules in the feature repository 132 that are used to provide Internet telephony feature handling for phone calls to one or more trunks assigned to the subscriber. For example, subscriber may use the computer 162 to log into the subscriber interface server 134 through the IP network 170, and then use applications hosted on the subscriber interface server 134 to define/modify one or more of the rules of the feature repository 132. The subscriber may thereby identify what phone calls are allowed/blocked, define whether and how phone calls are to be logged, define when and how phone calls are be forwarded to what phone number(s), and/or define the time of day window(s) and/or days of the week window(s) when phone call through their allowed or not allowed.

The Softswitch 120 responds to the call control response 228 by generating (block 230) a call control routing response (communication 232) that reroutes the phone call back to the switching system 110. The switching system 110 responds to the return phone call by generating another routing request (communication 234) to the SCP 140. The SCP 140 response thereto by generating a call routing response (block 236) that regulates (block 238) call termination by the switching system 110 so as to carry out the identified Internet telephony call handling. For example, the SCP 140 can regulate the switching system 110 to complete termination of the phone call to the called phone number line, to block termination of the phone call to the called phone number line, and/or to complete termination of the phone call to a plurality of identified phone number lines.

Accordingly, the communication system 100 provides Internet telephony like features for customers who are using analog phones and/or other communication terminals to make and/or receive calls that are terminated through the PSTN using TDM technology. The communication system 100 may reduce the complexity of the SCP 140 and/or complexity of the Softswitch 120, and/or may reduce/eliminate the need for shadow IP phone numbers to provide an Internet telephony overlay architecture, by using one or more dedicated trunks (e.g., trunk 115) to route phone calls from the PSTN 112 to the Softswitch 120 for subsequent routing to the Internet telephony call control complex 122 for Internet telephony feature handing.

The flowcharts and timing diagrams of FIGS. 2-6 illustrate exemplary architecture, functionality, and operations of embodiments of methods, systems, and/or computer program products for operating a communication system so as to provide Internet telephony features. In this regard, each block represents a module, segment, or portion of code, which comprises one or more executable computer program instructions and/or hardware operations for implementing the specified logical function(s). It should also be noted that in other implementations, the function(s) noted in the blocks may occur out of the order noted in FIGS. 2-6. For example, two blocks shown in succession may, in fact, be executed substantially concurrently or the blocks may sometimes be executed in the reverse order, depending on the functionality involved.

These computer program instructions may be executed by a processor of a general purpose computer, a special purpose computer, or other programmable data processing apparatus to produce a machine that carries out at least some of the functionality described herein with regard to various embodiments of the present invention. These computer program instructions may also be stored in a computer-usable or computer-readable medium that may direct a computer or other programmable data processing apparatus to function in a particular manner, such that the instructions stored in the computer-usable or computer-readable medium produce an article of manufacture including instructions that implement the function specified in the flowchart and/or block diagram block or blocks.

The computer-usable or computer-readable medium may be, for example but not limited to, an electronic, magnetic, optical, electromagnetic, or semiconductor system, apparatus, or device configured to at least temporarily store data. More specific examples (a nonexhaustive list) of the computer-readable medium would include the following: a magnetic memory (e.g., disk drive/diskette), a random access memory (RAM), a read-only memory (ROM), an erasable programmable read-only memory (EPROM or Flash memory), and a compact disc/digital video disk read-only memory (CD/DVD-ROM).

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

Many variations and modifications can be made to the embodiments without substantially departing from the principles of the present invention. All such variations and That which is claimed:

1. A method, comprising:

associating a plurality of phone numbers for time division multiplexed public switched telephone network lines with an Internet telephony feature group that has Internet telephony feature handling for calls terminating at the plurality of phone numbers for time division multiplexed public switched telephone network lines;

routing phone calls that are directed to the plurality of phone numbers associated with the Internet telephony feature group as destinations at the time division multiplexed public switched telephone lines through a dedicated trunk of the public switched telephone network to a softswitch, the dedicated trunk being set apart for a use of carrying only calls directed to the plurality of phone numbers, the calls directed to the plurality of phone numbers including calls originating from devices without voice over Internet Protocol service;

within the softswitch, selectively converting the phone calls to voice over Internet protocol phone calls for routing through the Internet protocol network to the Internet telephony call controller responsive to whether the phone calls are received by the softswitch on the dedicated trunk;

routing phone calls received by the softswitch on the dedicated trunk to an Internet telephony call controller for Internet telephony feature handling;

within the softswitch, routing phone calls through an Internet protocol network to the Internet telephony call controller for Internet telephony feature handling on the phone calls when the phone calls are received by the softswitch on the dedicated trunk;

receiving a call control response at the softswitch for one of the phone calls that is directed to one of the plurality of phone numbers associated with the Internet telephony feature group from the Internet telephony call controller;

terminating the one of the phone calls to the time division multiplexed public switched telephone network line corresponding to the one of the plurality of phone numbers when the call control response indicates the phone call is permitted; and blocking termination of the one of the phone calls to the time division multiplexed public switched telephone network line corresponding to the one of the plurality of phone numbers when the call control response indicates the phone call is not permitted;

wherein the time division multiplexed public switched telephone network lines associated with the plurality of phone numbers are not served by the Internet protocol network.

2. The method of claim 1, further comprising:

selectively routing via a signal control point of the public switched telephone network phone calls through the dedicated trunk to the softswitch in response to whether the phone calls are directed to phone numbers in the Internet telephony feature group.

3. The method of claim 2, further comprising:

routing via the signal control point only phone calls that are directed to phone numbers in the Internet telephony feature group through the dedicated trunk to the softswitch.

4. The method of claim 3, further comprising:

routing via the signal control point phone calls that are directed to phone numbers outside the Internet telephony feature group through trunks of the public switched telephone network other than the dedicated trunk.

5. The method of claim 1, further comprising:

within the Internet telephony call controller, querying a subscriber Internet telephony feature repository to identify telephony rules to be applied to a phone number of a phone call received from the softswitch; and within the Internet telephony call controller, generating a call control response in response to application of the identified telephony rules to the phone call; and within the public switched telephone network, responding to the call control response by regulating termination of the phone call through the public switched telephone network to a called phone number line.

6. The method of claim 5, further comprising:

within the Internet telephony call controller, generating the call control response that indicates to the public switched telephone network whether the phone call is permitted to be terminated through the public switched telephone network to the called phone number line; and within the public switched telephone network, terminating the phone call through the public switched telephone network to the called phone number line when the call control response indicates the phone call is permitted, and blocking termination of the phone call through the public switched telephone network to the called phone number line when the call control response indicates the phone call is not permitted.

7. The method of claim 6, further comprising:

the call control response generated by the Internet telephony call controller further indicates to the public switched telephone network whether the phone call is to be forwarded to an alternate phone number line that is different than the called phone number line, and within the public switched telephone network, terminating the phone call through the public switched telephone network to the alternate phone number line in response to the call control response indicating that the phone call is to be forwarded.

8. The method of claim 7, further comprising:

the call control response generated by the Internet telephony call controller further identifies to the public switched telephone network that the phone call is to be terminated to a plurality of group-call phone number lines, wherein one of the group-call phone number lines is different than the called phone number line; and within the public switched telephone network, establishing simultaneous communication paths for the phone call through the public switched telephone network to the plurality of group-call phone number lines, which are identified by the call control response.

9. The method of claim 5, further comprising:

responding to instructions received by the Internet telephony call controller from a subscriber over an Internet protocol network by defining telephony rules in the subscriber Internet telephony feature repository for a phone number of a line that is associated with the subscriber.

10. A system, comprising:
a processor; and
a memory coupled to the processor and comprising computer readable program code that when executed by the processor causes the processor to perform operations comprising:
associating a plurality of phone numbers for time division multiplexed public switched telephone network lines with an Internet telephony feature group that has Internet telephony feature handling for calls terminating at the plurality of phone numbers for time division multiplexed public switched telephone network lines;
routing phone calls that are directed to the plurality of phone numbers associated with the Internet telephony feature group as destinations at the time division multiplexed public switched telephone lines through a dedicated trunk of the public switched telephone network to a softswitch, the dedicated trunk being set apart for a use of carrying only calls directed to the plurality of phone numbers, the calls directed to the plurality of phone numbers including calls originating from devices without voice over Internet Protocol service;
within the softswitch, selectively converting the phone calls to voice over Internet protocol phone calls for routing through the Internet protocol network to the Internet telephony call controller responsive to whether the phone calls are received by the softswitch on the dedicated trunk;
routing phone calls received by the softswitch on the dedicated trunk to an Internet telephony call controller for Internet telephony feature handling;
within the softswitch, routing phone calls through an Internet protocol network to the Internet telephony call controller for Internet telephony feature handling on the phone calls when the phone calls are received by the softswitch on the dedicated trunk;
receiving a call control response at the softswitch for one of the phone calls that is directed to one of the plurality of phone numbers associated with the Internet telephony feature group from the Internet telephony call controller;
terminating the one of the phone calls to the time division multiplexed public switched telephone network line corresponding to the one of the plurality of phone numbers when the call control response indicates the phone call is permitted; and
blocking termination of the one of the phone calls to the time division multiplexed public switched telephone network line corresponding to the one of the plurality of phone numbers when the call control response indicates the phone call is not permitted;
wherein the time division multiplexed public switched telephone network lines associated with the plurality of phone numbers are not served by the Internet protocol network.

11. The system of claim 10, wherein the operations further comprise:
selectively routing via a signal control point of the public switched telephone network phone calls through the dedicated trunk to the softswitch in response to whether the phone calls are directed to phone numbers in the Internet telephony feature group.

12. The system of claim 11, wherein the operations further comprise:
routing via the signal control point only phone calls that are directed to phone numbers in the Internet telephony feature group through the dedicated trunk to the softswitch.

13. The system of claim 12, wherein the operations further comprise:
routing via the signal control point phone calls that are directed to phone numbers outside the Internet telephony feature group through trunks of the public switched telephone network other than the dedicated trunk.

14. The system of claim 10, wherein the operations further comprise:
within the Internet telephony call controller, querying a subscriber Internet telephony feature repository to identify telephony rules to be applied to a phone number of a phone call received from the softswitch; and
within the Internet telephony call controller, generating a call control response in response to application of the identified telephony rules to the phone call; and
within the public switched telephone network, responding to the call control response by regulating termination of the phone call through the public switched telephone network to a called phone number line.

* * * * *